June 30, 1959 R. L. FREEMAN 2,892,885

APPARATUS AND SYSTEM FOR DETERMINING AND RECORDING THE TRANSMITTING STATION TO WHICH A WAVE SIGNAL RECEIVER IS TUNED

Filed Aug. 17, 1953 3 Sheets-Sheet 1

INVENTOR.
Robert L. Freeman
BY Mason, Kolehmainen, Rathburn & Wyss, Attys

June 30, 1959 R. L. FREEMAN 2,892,885

APPARATUS AND SYSTEM FOR DETERMINING AND RECORDING THE TRANSMITTING STATION TO WHICH A WAVE SIGNAL RECEIVER IS TUNED

Filed Aug. 17, 1953 3 Sheets-Sheet 2

INVENTOR.
Robert L. Freeman
BY
Mason, Kolehmainen, Rathburn & Wyss
Att'ys

June 30, 1959 R. L. FREEMAN 2,892,885

APPARATUS AND SYSTEM FOR DETERMINING AND RECORDING THE TRANSMITTING STATION TO WHICH A WAVE SIGNAL RECEIVER IS TUNED

Filed Aug. 17, 1953 3 Sheets-Sheet 3

INVENTOR.
Robert L. Freeman
BY
Mason, Kolehmainen, Rathburn & Wyss
Att'ys

United States Patent Office
2,892,885
Patented June 30, 1959

2,892,885

APPARATUS AND SYSTEM FOR DETERMINING AND RECORDING THE TRANSMITTING STATION TO WHICH A WAVE SIGNAL RECEIVER IS TUNED

Robert L. Freeman, Evanston, Ill., assignor to A. C. Nielsen Company, Chicago, Ill., a corporation of Delaware Application August 17, 1953, Serial No. 374,593

29 Claims. (Cl. 178—5.8)

The present invention relates to a system and apparatus for determining the frequency of the carrier signal to which a wave signal receiver such as a radio or television receiver is tuned. More particularly, the present invention relates to an improved instrumented method and apparatus for determining the audience popularity of different programs transmitted from one or more wave signal transmitters, and is especially effective in connection with monitoring television receivers, primarily because of the presence of synchronizing pulses in the television signal.

Heretofore there have been disclosed numerous instrumented methods and apparatus for determining the listening habits of home wave signal receiver users. Some such means are disclosed in the following United States patents: 2,175,937, 2,305,834, 2,354,836, 2,439,201, 2,483,573, 2,484,733, 2,513,360, 2,552,585, 2,573,279, 2,618,694, 2,618,743, 2,630,366, 2,630,367, etc. Generally, such devices involve the use of a recorder or indicating device operating in conjunction with each receiver utilized in the home, which home is one of a group of selected homes in a sample of homes which is chosen to be representative of a typical audience in a particular area, or on a national scale, as the case may be. Such apparatus generally comprises facilities for driving a movable record receiving element such as movable paper tape, magnetic tape or wire, movable film, or any other similar recording medium. The record receiving element is generally moved in a predetermined manner with respect to time, and associated with it is equipment for applying to the record receiving element the necessary record representative of the tuning condition of a particular wave signal receiver or receivers with which the recording equipment is associated.

If the record receiving element moves in some predetermined relationship with respect to time, it will be apparent that a record with respect to time will be obtained of the tuning condition of the associated receiver. Generally, some additional time information, as disclosed and claimed in United States Letters Patent No. 2,660,509 to Rusch, is applied to the record receiving element as a check on the predetermined movement with respect to time of the record receiving element and as a means of orientating the record obtained on the record receiving element with respect to time. The number of homes in the sample of homes representative of the radio or television audience may be varied, and a sufficient number will be chosen to produce an accurate sample which is representative of the class of listeners and viewers in the area under consideration. These homes are chosen on a basis whereby all variable factors, such, for example, as the number of potential listeners, economic affluence, religion, etc., which normally affect any process of sampling public opinion, are accounted for on a correctly weighted basis. Such instrumented methods have utilized a wide variety of apparatus all the way from relatively simple mechanical devices to much more complicated devices involving electromechanical as well as electronic elements. The more complicated arrangements have been necessitated by virtue of the complexity of the wave signal receivers being monitored, and also the difficulty and, in fact, impossibility in many cases of attaching simple means to receivers to be monitored for indicating the tuning condition thereof.

In recent years the television audience in the United States as well as elsewhere has increased by leaps and bounds, and the home television audience is becoming a larger and more important segment of the home wave signal receiver audience than is the home radio audience. In fact, in many urban centers the radio audience has been greatly reduced in recent years. Simple mechanical means for indicating the position of the tuning shaft of television receivers is complicated by the fact that, in general, the tuning shafts of television receivers comprise the inner one of a pair of concentric shafts. Likewise, in order to prevent what is known as conditioning the sample, it is desirable that the collaborator's receiver which is being monitored is one owned by the collaborator, and to which is attached a suitable recording means. Obviously, the statistical choice of collaborator homes may require the monitoring of a large number of different types and kinds of receivers. This is a difficult problem when it is remembered that there are literally hundreds of different television receivers being manufactured today. Many of these receivers are expensive devices costing from hundreds of dollars to even more than a thousand dollars, and the collaborator is not very agreeable to permitting the making of complicated changes or the addition of elaborate monitoring equipment with such a receiver. Consequently, it is desirable to provide instrumented means for indicating and recording the listening or viewing habits of wave signal receivers, especially adapted for television receivers in view of their greatly increased popularity, which provides a minimum of equipment, which can be kept in a compact place, preferably within the cabinet of the receiver being monitored, which can be applied to the monitored receiver in a very simple manner without in any way interfering or requiring substantial changes in the receiver itself, and which is foolproof in operation, producing a continuous record of the tuning condition of the particular receiver, or, in the case of multireceiver homes, a record of the tuning condition of several receivers.

Accordingly, it is an object of the present invention to provide a new and improved apparatus and system for determining the listening and viewing habits of wave signal receiver users.

It is another object of the present invention to provide an improved apparatus for indicating or recording the tuning condition of wave signal receivers in general, and television receivers in particular.

It is a further object of the present invention to determine the carrier frequency to which a wave signal receiver is tuned by causing a change in amplitude to the carrier signal input to the receiver and sensing the effect of this change at some later point within the receiver itself.

Still another object of the present invention resides in the provision of a simple measuring apparatus for measuring and recording with respect to time the tuning condition of wave signal receivers capable of being tuned to one or more of a plurality of different transmitting stations transmitting program signals receivable by such receivers.

It is a further object of the present invention to provide improved means for modulating the incoming signal to a wave signal receiver and sensing this modulation by a circuit connected to some point following the selective circuits of such receiver.

It is another object of the present invention to provide improved apparatus for determining with respect to time the tuning condition of a wave signal receiver which can be associated with the receiver being monitored with only simple connections thereto and which can be disposed in a very small space so as to be unobjectionable to the collaborator whose receiver is being monitored.

It is a further object of the present invention to provide an arrangement in which the television synchronizing pulses of a carrier signal are usable in determining the listening and viewing habits of users of such receivers.

It is another object of the present invention to determine the channel to which a wave signal receiver is tuned by coupling a tuned circuit with a circuit carrying the input signal to a wave signal receiver in a manner to absorb energy from said signal together with means for detecting this energy change.

It is still another object of the invention to provide improved facilities for selectively extracting signal energy from a high frequency signal transmission line.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which.

Figure 1:
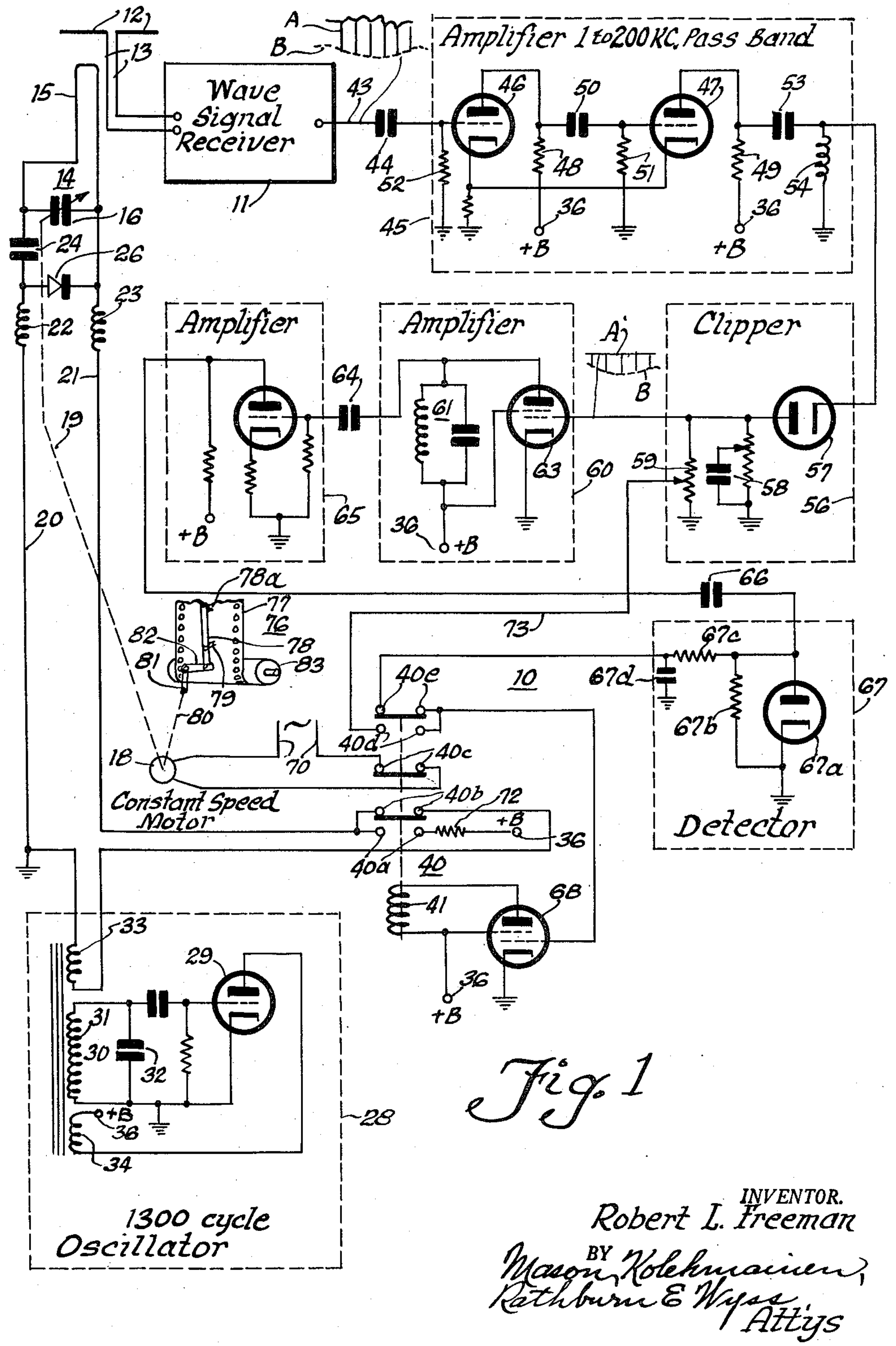
Fig. 1 is a schematic diagram of a system and apparatus illustrating one embodiment of the present invention for recording the listening and viewing habits of wave signal receiver users.

Briefly, the present invention is concerned with modulating the incoming signal to a wave signal receiver by means of a device capable of selectively modulating this incoming signal and then sensing this modulation by means connected at some point in the receiver being monitored following the receiver selective circuits. The means for modulating the signal may comprise signal absorbing means for absorbing some of the incoming signal energy, or signal increasing means for amplifying or adding to the incoming signal. The modulation effected on the incoming signal may be continuously applied, in which case it must, of course, be an innocuous modulation so as not to interfere with the operation of the receiver being monitored. In a radio receiver, or insofar as the sound portion of television receiver is concerned, it will be obvious that if the modulating frequency chosen is above or below the audio spectrum, then it will be innocuous.

In a television receiver it will be extremely difficult, of course, to hide such modulation merely by a choice of its frequency. However, in a television receiver there are certain periods, such as between the end of one line and the beginning of the next line, or between the end of one frame and the beginning of the next frame, which might be used to place modulation upon the signal. In a copending application of Stephen F. Bushman, Serial No. 374,761, filed August 17, 1953, there is disclosed and claimed an improvement on the present invention, wherein modulation is applied to the incoming television signal in what is commonly referred to as the "back porch" of the television signal. Such modulation will be innocuous and may be applied continuously without impairing the television reception. Such modulation for a television receiver would have to be synchronous with the synchronizing information applied to the signal in order to be placed on the television signal without interfering with television reception. For the purpose of illustrating the present invention, only a relatively few embodiments are disclosed, and these are directed to means where energy is taken away from the incoming signal rather than adding energy to the incoming signal. This provides a very simple arrangement, but it should be understood that applicant's invention is sufficiently broad to cover arrangements where energy is added as well as subtracted from the incoming signal, and then this energy is sensed at some later point in the receiver being monitored. Where the modulation is not innocuous, means must be provided to render the modulation means inoperative during the time the tuning condition of the receiver remains unchanged and subsequent to the metering equipment having operated to produce an indication or record of the tuning condition. When the modulation means is again rendered effective, which should be immediately upon retuning the receiver, it will be available for determining the new tuning condition of the receiver.

The modulation component may be obtained by utilizing and modifying a signal already present in the incoming signal to the receiver, which is possible in the case of a television signal as disclosed and claimed in the above-mentioned Bushman application. For more general application there may be employed, as described hereinafter, a source of modulation separate and distinct from the receiver being monitored. Also as described herein, the cyclic absorption of energy from the incoming signal to the monitored receiver may alone be employed to determine the tuning condition of such receiver.

Referring now to Fig. 1 of the drawings, there is illustrated an apparatus generally designated by the reference numeral 10 for indicating and recording the tuning condition of a wave signal receiver designated by the reference numeral 11. This wave signal receiver has been specifically designated as a television receiver, since the present invention is particularly adapted for use with a television receiver, but it should be understood that it might equally well comprise some other receiver such as an ordinary amplitude modulation radio receiver or a frequency modulation receiver or the like. The television receiver is indicated as having associated therewith a conventional dipole antenna 12 which is connected thereto by means of a coaxial cable or twin transmission lead 13. It is presently contemplated that television receivers will utilize both the ultra high frequency band and the very high frequency band, and it may be necessary to provide two separate antennas for each band if reception in all bands is contemplated, each capable of operating in its own band, namely, the UHF band in one case, and the VHF band in another case. Likewise, two separate transmission lines such as 13 may be required if two separate antennas are employed. At the present tme in the VHF band the conventional 300 ohm twin lead has been found to be satisfactory, but in the UHF band the losses in such a twin lead have been too great and it is customary to use a coaxial transmission line in this band. If a twin lead transmission line is used, the required coupling between the tuned circuit 14 and the line may be obtained by positioning the inductance element 15 of the tuned circuit in close proximity to the line. On the other hand, if coaxial cable is used as the transmission line, it may be necessary to insert a short length of balanced line in the coaxial cable in the manner more fully described below in connection with Fig. 5, and to position the inductance element 15 in close proximity to the balanced line section in order to obtain the desired degree of coupling between the transmission line and the tuned circuit 14. As a further alternative direct conductive coupling between the line 13 and the tuned circuit 14 may be used to obtain the desired signal energy transfer from the line to the tuned circuit 14. In any case, it will be understood that the present invention is applicable whether one or two antennas 12 are required for the receiver 11, and one or two transmission lines 13 are similarly required.

To illustrate the present invention, there is provided in Fig. 1 of the drawings an arrangement for modulating the incoming signal to the receiver 10 in the form of an absorption modulator circuit for absorbing or extracting energy from the transmission line 13 connecting the antenna 12 with the monitored receiver 11. As illustrated, this absorption modulator circuit for modulating the high frequency energy received by the antenna 12 and transmitted to the receiver 11 through the transmission line 13 comprises a resonant circuit, generally designated by the reference numeral 14, and tunable over the frequency spectrum of frequencies capable of being received by the receiver 11. The resonant circuit 14 is illustrated as comprising a section of a balanced transmission line or coil 15 which may have one or more turns, and a variable capacitor 16. The parameters of the coil 15 and capacitor 16 are so chosen that the resonant circuit 14 may be tuned over the band of the frequencies receivable by the wave signal receiver 11. Also in accordance with the present invention, the tuned or resonant circuit 14 is inductively and capacitively coupled to the transmission line 13 which carries the signal received by the antenna 12 to the wave signal receiver 11. It will be appreciated that whenever the resonant frequency of the tuned circuit 14 is the same as the frequency of the signal received by the antenna 12, the tuned circuit 14 will be capable of effectively absorbing or bleeding energy from the signal input to the receiver 11, and when this occurs there will, therefore, be a decrease in the signal level received by the wave signal receiver 11.

For the purpose of varying the resonant frequency at which the tuned circuit 14 is resonant so that it may modulate the different frequencies receivable by the receiver 11, the capacitor 16 has been illustrated as a variable capacitor variable to tune the resonant circuit 14 through the range necessary for the frequencies receivable by the receiver 11. As illustrated in Fig. 1, the capacitance of capacitor 16 is preferably varied over the range thereof by means of a driving motor 18 suitably connected thereto by a mechanical connecting 19. This motor 18, upon rotation thereof, will cause the capacitor 16 to vary, whereby the tuned circuit 14 scans the frequency spectrum insofar as the resonance thereof is concerned at a relatively slow rate such as one cycle per minute or any other similar rate. The motor 18 is preferably a constant speed motor such as a synchronous motor. It will be appreciated that the particular capacitance setting of the capacitor 16, and, hence, the particular position of the shaft 19 of the motor 18 when the resonant frequency of resonant circuit 14 coincides with the frequency of the signal tuned in by the receiver 11, will be an accurate indication of the tuning condition of receiver 11. It is merely necessary then to provide means to sense when such frequency coincidence conditions exist. Such means are described hereinafter. To this end the tuned circuit 14 is connected by suitable conductors 20 and 21 with a circuit means described in detail hereinafter. However, to prevent the impedance between the conductors 20 and 21 from affecting the tuning of the tuned circuit 14, suitable radio frequency choke coils 22 and 23 are provided at the ends of the conductors 20 and 21. Also, a radio frequency by-pass condenser 24 is connected in series with the tuned circuit 14 to prevent this tuned circuit from loading the oscillator 28. It should be noted that the condenser 24 has a low impedance at radio frequencies and a very high impedance for audio frequencies.

In order to provide a means for modulating the impedance of the tuned circuit 14 and, consequently, for modulating the incoming carrier signal receivable by the receiver 11, there is provided a diode 26 connected in series with the by-pass condenser 24. This diode 26, which may be a germanium diode, for example, is provided for damping the modulating element including the tuned circuit 14. As shown, the diode 26 shunts the tuned circuit 14 through the condenser 24, the cathode of the diode being connected to the condenser 24 and the anode of the diode being connected to the choke coil 23. It will be apparent that when a voltage of a polarity that makes the anode positive is applied to the diode 26 to make it conductive, a resistive shunt is effectively applied to the tuned circuit 14. This resistive shunt so damps the tuned circuit 14 as to cause its absorption effect to become negligible. When a voltage of the opposite polarity or a different polarity is applied to the diode 26, it is rendered nonconductive and all damping effect is removed from the tuned circuit 14, with the result that its absorption effect is then at a maximum. No appreciable signal absorption occurs, however, unless there is frequency coincidence between the incoming signal to receiver 11 and the resonant frequency of the tuned absorption modulator circuit 14. If the diode 26 is a germanium diode, its back resistance will provide the necessary direct current path. If, however, diode 26 is a thermionic diode, then a direct current path in the form of a resistor or the like connected across the choke coils 22 and 23 may be provided.

In order to produce or generate a modulating signal for controlling the conductivity of diode 26, there is provided in accordance with the present invention a signal generator designated by the reference numeral 28. This signal generator in the form of an oscillator is illustrated as generating signals having a frequency of 1300 cycles. This is a frequency far removed from the frequency of either of the vertical or horizontal synchronizing signals, and, hence, the modulation is asynchronous as far as these signals are concerned if receiver 11 is a television receiver. The modulation component is within the audio spectrum, however. The particular choice of frequency for the generator 28 may be widely varied and the 1300 cycle frequency is by way of example only.

Any suitable oscillator may be incorporated in the signal generating unit 28, and, as illustrated, a tickler coil oscillator is shown comprising a suitable triode 29 having associated therewith a tuned circuit 30 including an inductance 31 and a capacitor 32. The inductance 31 is inductively coupled with an output winding 33 and the tickler coil 34 which is conventionally included in the plate circuit of the triode 29 connected to a source of +B potential designated by the reference numeral 36. The oscillator output winding 33 is connected to the conductors 20 and 21 through a first set of lockout contacts 40*b* of a suitable motor control relay 40 having a winding 41, the purpose of which relay will be better understood from the ensuing description. Whenever the contacts 40*b* are closed, it will be apparent that a 1300 cycle oscillation will be applied to the absorption modulator circuit 14 by virtue of rendering the diode 26 conductive and nonconductive at a 1300 cycle frequency. When the absorption modulator circuit 14 has its resonant frequency coincident with the frequency tuned in by receiver 11, and with the contacts 40*b* closed, there will be absorbed signal energy from the transmission line 13 whenever diode 26 is nonconductive. Since this occurs 1300 times per second, there will effectively be applied to the incoming signal a 1300 cycle amplitude modulation only when the frequency coincidence mentioned above exists, which modulation component can be sensed at a stage in said receiver following the selector stages.

In a television receiver the presence or absence of synchronizing signals is a simple way of noting whether a tuning change has occurred. A tuning change can be indicated by other means in a television receiver and must be indicated by other means in a radio receiver. For the purpose of illustrating the present invention, receiver 11 is assumed to be a television receiver whereby the absence of horizontal synchronizing pulses may be used to indicate retune of the receiver. Hence, it is desirable that the signal obtained from the receiver 11 for sensing the 1300 cycle modulation component also include the horizontal synchronizing pulses. Thus, in order to sense the effect of the modulation applied by the absorption modulator circuit 14, there is obtained from a suitable point within the receiver a signal including the horizontal synchronizing pulses which are always present in a television receiver when the receiver is tuned to a particular television transmitting station. This signal, including the horizontal synchronizing pulses when present and the 1300 cycle modulation component when present, may be obtained from the receiver 11 in any suitable manner, and, as illustrated, is supplied through a suitable conductor 43 and coupling capacitor 44 to a two-stage amplifier generally designated by the reference numeral 45. The amplifier 45 is a band pass amplifier capable of passing a band of signals including the frequencies of the oscillator 28 and the horizontal synchronizing pulses. Where the oscillator 28 has a frequency of 1300 cycles, as indicated above, the amplifier 45 preferably will pass a band of frequencies from 1000 to 200,000 cycles, thus including the horizontal synchronizing pulses of 15.75 kilocycle frequency conventional in television systems as used in the United States today. The details of the two-stage amplifier are not important as far as the present invention is concerned, and, as illustrated, this amplifier comprises a pair of tandem related triodes 46 and 47. The plate circuits of these triodes are connected to a source of +B potential 36 through suitable plate coupling resistors 48 and 49, respectively. The plate circuit of the triode 46 is coupled by means of the capacitor 50 with the grid circuit of the triode 47, which grid circuit includes a suitable grid leak resistor 51. A similar grid leak resistor 52 is associated with the triode 46. The plate circuit of the triode 47 is connected through a filter comprising the capacitor 53 and the inductance 54, whereby signals of a frequency below 1000 cycles are prevented from passing beyond the amplifier 45. The signals obtained from receiver 11 and supplied to the two-stage amplifier 45 are indicated by the small curve diagram in Fig. 1 marked by the letter A, this curve representing a condition when the signal obtained from the receiver 11 contains both negative going horizontal synchronizing pulses and the 1300 cycle modulating component. Thus, it will be observed that the 1300 cycle signal is present in the form of the envelope B shown in dotted lines associated with the curve A.

Since it is desirable to use the 1300 cycle signal for control purposes to be described hereinafter, the output of the two-stage amplifier 45 is connected to a clipper, generally designated by the reference numeral 56, the purpose of which is to remove part of the synchronizing signal amplitude in the white direction, thereby accentuating the ratio of the 1300 cycle modulating signal component to the amplitude of the 15.75 kilocycle horizontal synchronizing signal component. The output of the clipper is indicated by the curve diagram A′, and the same 1300 cycle modulating component represented by the envelope B is illustrated as being present. The clipping action, however, has greatly accentuated the ratio of the 1300 cycle modulating signal to the horizontal synchronizing pulse signal. The clipper 56 may comprise any conventional clipping circuit and is illustrated as including a diode 57, the plate circuit of which is provided with an adjustable circuit means 58 for controlling the clipping level. For purposes which will become apparent as the following description proceeds, a potentiometer 59 is connected to the output of the clipper, whereby variable control voltages may be obtained therefrom.

To utilize the 1300 cycle modulating component for control purposes, the output of the clipper 56 is applied to a tuned amplifier 60, including a tuned circuit 61 resonant at 1300 cycles. This tuned circuit selects the 1300 cycle component appearing at the output of the clipper 56, whereupon the output of the amplifier 60 is a 1300 cycle sine wave signal, as will readily be appreciated by those skilled in the art. The amplifier 60 may be any conventional amplifier specifically illustrated as comprising a tetrode 63. The output of the amplifier 60 is supplied through a suitable coupling capacitor 64 to an amplifier 65, and from the amplifier 65 through a coupling capacitor 66 to a detector 67. This detector comprises a diode **67*a* shunted by a load resistor 67*b*, and by a filter circuit consisting of the resistor 67*c* and the condenser 67*d*. As will be understood, this filter circuit performs the function of preventing the alternating current component of the voltage developed across the load resistor 67*b*** from appearing at the output side of the filter circuit.

The output of the detector 67 is supplied to the control electrode of a relay control tube 68 through a set of contacts **40*e* of the relay 40. The circuitry is so arranged that the output of the detector 67 produces a negative bias for the relay control tube 68. Actually, in Fig. 1 of the drawings, the relay 40 is illustrated as being energized, but the presence of the rectified 1300 cycle modulating component which produces a negative bias for the control electrode of relay control tube 68 deenergizes the relay 40. As illustrated, the relay winding 41 has one terminal thereof connected to a source of +B potential 36, while the other terminal of the relay winding 41 is connected to the anode of the relay control tube 68 which is illustrated as a tetrode. Thus, it will be apparent that the presence of the 1300 cycle modulating signal on the television signal received by receiver 11 will be detected by the detector 67 and will cause the relay 40** to be deenergized.

The relay 40 is essentially a motor control relay, and the motor control contacts **40*c* thereof are connected in series with the energizing circuit of the motor 18 which is connected to a source of alternating potential designated by the reference numeral 70. As long as the relay 40 is energized, as shown in Fig. 1 of the drawings, the motor 18 will continue to operate and cause the absorption modulator circuit 14 to scan the frequency spectrum. The presence of the 1300 cycle signal, however, which can only occur at the conductor 43 when the tuning condition of the absorption modulator circuit 14 corresponds to the frequency of the channel tuned in by receiver 11, will cause the relay 40 to be deenergized and the motor 18 to stop at a position corresponding to the tuning condition of the receiver 11. Obviously, if a record of the shaft position of the motor 18 were made at that time, this record will be indicative of the tuning condition of receiver 11**.

In view of the fact that the 1300 cycle signal might be undesirable when superimposed on the television signal during normal tuning conditions, it is preferably desirable to lock out the absorption modulator circuit 14 or render it ineffective during the time that the receiver 11 remains tuned to the same channel. It will be apparent that the diode 26 will cyclically conduct at a frequency of 1300 cycles as long as the 1300 cycle oscillator is connected to the modulator circuit 14, thus applying the 1300 cycle modulation. If means were provided to render the diode 26 conductive continuously, then the modulator circuit 14 would be rendered ineffective, and to this end the first set of lockout contacts **40*b* are provided which disconnect the oscillator 28 from the circuit 14 when relay 40 is deenergized, and a second set of lockout contacts 40*a* are provided on the relay 40**, whereby a direct current potential from the +B source 36 is supplied through a voltage dropping resistor 72 to the diode 26. It will be apparent, therefore, that when the relay 40 is deenergized, the modulator circuit 14 is ineffective to absorb any energy from the transmission line 13, nor will it in any substantial way affect the signal supplied to the receiver 11. Likewise, under these conditions the contacts 40*c* of the relay 40 are opened, thus stopping the motor 18 in a position indicative of the tuning condition of the wave signal receiver 11.

It will be apparent that as soon as the relay 40 is deenergized, the 1300 cycle modulation signals will no longer appear in the conductor 43, and the negative bias potential which was applied to the relay control tube 68 developed from the 1300 cycle component is no longer present. Without provisions to be described, the relay control tube 68 would immediately become conductive upon the cessation of the production of the 1300 cycle modulating component. For the purpose of maintaining the relay 40 deenergized once it has been deenergized, until a retuning of the receiver 11 occurs, and to obtain automatic recycling upon retuning of receiver 11, which, in the case of a television receiver, causes momentary cessation of the synchronizing pulses, there is provided in accordance with the present invention in addition to the relay contacts 40*e* already mentioned another set of relay contacts 40*d*. The relay contacts 40*e*, as described above, are connected in the circuit between the detector 67 and the control electrode of the relay control tube 68. Upon deenergization of the relay 68, this circuit is interrupted, since, obviously, upon deenergization of the relay 40 no component representative of the 1300 cycle signal will appear at the detector 67. However, the presence of synchronizing signals produces a negative bias at the output of the clipper 56 which is sufficient to maintain the relay 40 deenergized. Accordingly, the contacts 40*d* are connected in a circuit between the control electrode of the relay control tube 68 and the clipper 56. As illustrated, one of the contacts 40*d* is connected by a conductor 73 to an adjustable tap on the potentiometer 59, whereby the necessary bias potential to maintain the relay control tube 68 nonconductive and the relay 40 deenergized once it has been deenergized may be supplied. With this arrangement there is provided an inherent, automatic recycling arrangement for the lockout mechanism, because any change in tuning of the television receiver 11 will momentarily interrupt the synchronizing signals, and such interruption of the synchronizing signals will remove the bias on the relay control tube 68 supplied through the conductor 73 and the contacts 40*d* of the relay 40. Thus, when the receiver 11 is retuned, the relay tube 68 is permitted to conduct sufficiently to energize the relay 40, thereby restoring the effectiveness of the modulator circuit 14.

In the system arrangement described above, the oscillator 28 is primarily utilized to amplitude modulate the signal energy introduced into the high frequency section of the receiver 11 from the antenna circuit comprising the antenna 12 and the transmission line 13. In actual practice it has been found that the 1300 cycle oscillator also has the effect of frequency modulating the signal energy introduced into the high frequency section of the receiver 11. This is due to the fact that the series inductance and shunt capacitance of the diode 26 are varied at the 1300 cycle frequency rate of the oscillator 28 to correspondingly vary the tuning of the circuit 14. Such variations in the tuning of the circuit 14 have the effect of correspondingly varying the phase of the signal energy introduced into the high frequency section of the receiver 13, so that a 1300 cycle frequency modulation component is present in the signal reproduced in the lower frequency sections of the receiver 11 and impressed upon the circuit conductor 43. It will be understood, therefore, that the 1300 frequency modulation component may, if desired, be relied upon as the measurable response signal rather than the amplitude modulation component of the signal voltage developed on the conductor 43. In such case, the clipper 56, amplifiers 60 and 65, and detector 67 should be replaced by tandem related limiter and frequency discriminator stages, with the output voltage from the discriminator stage being arranged to control the relay control tube 68.

It will be appreciated that if the presence of the 1300 cycle signal is innocuous and will in no way interfere with the satisfactory operation of the receiver 11, then the lockout arrangement described may be omitted and the contacts 40*b*, 40*d* and 40*e* of the relay 40 would not be employed. In that case the only connection to the control electrode of the relay control tube 68 would be the connection between the detector 67 and this control electrode. Likewise, under these conditions the relay would function only as a motor control relay, as in Fig. 3 of the drawings.

It will be apparent that any suitable indicating or recording means may be employed to produce a continuous record or a continuous indication of the tuning condition of the wave signal receiver 11. The most obvious arrangement for recording the tuning condition of receiver 11 would be a mechanical link between the motor 18 and the stylus of a suitable recorder. Such a recording arrangement is schematically indicated in Fig. 1 by the reference numeral 76. The recorder 76 is very similar to the recorder disclosed in United States Letters Patent No. 2,618,743, granted November 18, 1952, and assigned to the same assignee as the present application. As there illustrated, the recorder 76 includes a movable record receiving element 77 upon which recordings are produced by means of an oscillating stylus 78 having an inscribing portion 78*a* adapted to move transversely of the record receiving element 77. The stylus 78 is mounted for oscillating movement about a pivot 79. The oscillating movement of the stylus 78 is obtained by means of a driving connection with a synchronous motor such as 18. This driving connection is illustrated as comprising a shaft 80, a crank 81, and a link 82. The movable record receiving element 77 is preferably moved at a constant speed by suitable means not shown from a supply spool 83 to a driven take-up spool not shown. When the synchronous motor 18 is energized, it will be apparent that the inscribing portion 78*a* of the stylus 78 will move transversely of the record receiving element 77. When the motor 18 is deenergized, the inscribing portion 78 will be maintained at a predetermined position determined by the particular tuning condition of the receiver 11, and a straight line record, due to movement of the record receiving element 77, will be produced. Obviously, as far as the present invention is concerned, any other suitable means for producing a record may be employed, and the particular recording means is illustrated by way of example only. If desired, a suitable position switch may be connected to the motor 18 to translate the angular position of the shaft of the motor 18 to suitable electrical signals, which electrical signals may, in turn, be used to control a suitable recording device. Such position switch arrangements are fully disclosed in a copending application, Serial No. 147,302, Krahulec, filed March 2, 1950, and assigned to the same assignee as the present application.

In view of the detailed description included above, the operation of the present invention will readily be understood by those skilled in the art. Assuming that the relay 40 is energized as shown in Fig. 1 of the drawings, and the wave signal receiver 11 is a television receiver tuned to receive a particular carrier radiated from one of the television transmitters within the reception range of the receiver 11, the motor 18 will be energized, since the contacts 40*c* of the relay 40 are closed. Accordingly, the motor 18 will cause the stylus 78 to move back and forth across the record receiving element 77 and will cause the capacitance of capacitor 16 to vary cyclically so that the resonant modulator circuit 14 sweeps the television frequency spectrum. Since the contacts 40*b* are closed under these conditions, a 1300 cycle oscillation or any other suitable oscillation dependent upon the frequency of the oscillator 28 will be applied to the absorption modulator 14 causing the diode 26 to conduct periodically. When the motor 18 adjusts the capacitor 16 to a capacitance which causes the resonant frequency of the tuned circuit 14 to correspond with the carrier frequency tuned in by the receiver 11, there will be a cyclical absorption of energy from the transmission line 13 by the absorption modulator 14, which absorption will, in effect, produce a 1300 cycle modulating component. This modulating component is amplified and detected as a negative bias and applied to the relay control tube 68 with the resultant deenergization of the relay 40. Moreover, the presence of the horizontal synchronizing signals will maintain the relay 40 deenergized once it has been deenergized until a change in tuning occurs. Thus, a continuous record will be produced with respect to time of the tuning condition of the receiver 11, with the modulating signal rendered ineffective as soon as the tuning condition has been determined, and remaining ineffective until the horizontal synchronizing pulses are momentarily interrupted due to change in tuning of the receiver 11. In the event that, due to failure of the transmitting station, the horizontal synchronizing pulses disappear for a short time, the recording device will "fail safe," since it will merely cause recycling of the monitoring apparatus to check on the subsequent tuning condition of the receiver 11.

Figure 2:
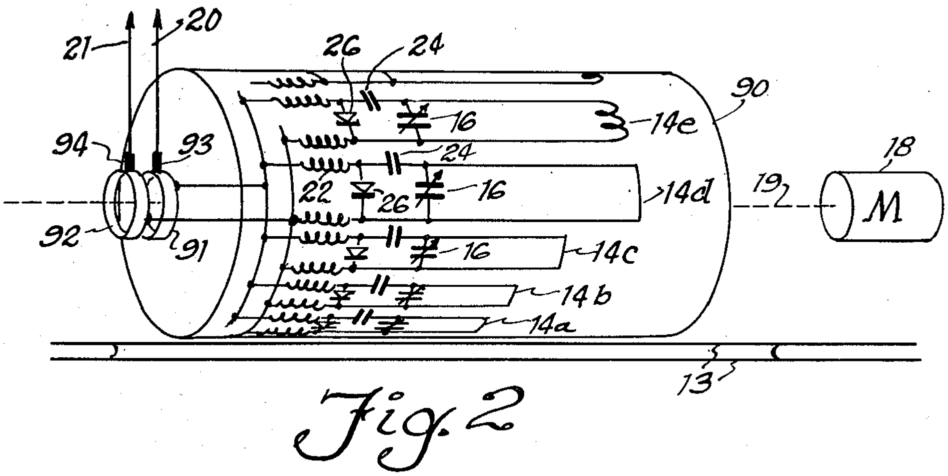
Fig. 2 is a somewhat schematic diagram of a portion of Fig. 1 to illustrate a modification of this portion.

For the purpose of explaining the present invention, the absorption modulator circuit 14 has been illustrated as a simple circuit tunable by a variable condenser 16. It will be appreciated that the frequency spectrum which has been set aside for television use comprises frequencies in relatively widely separated bands, including, in addition to the VHF band, the UHF band. In actual practice, it would be difficult to cover with a single variable frequency device the entire range which would have a change in frequency of the order of twenty to one. A practical circuit would, therefore, require two to four separate absorption modulator circuits, each tunable over a portion of the television frequency spectrum. A group of such circuits, each continuously tunable over a portion of the television frequency spectrum range, would require switching from one circuit to the other. This would be a fairly complicated problem at the frequencies involved, and, preferably, it would be desirable to use a multiplicity of fixed tuned circuits. In other words, Fig. 1 is a schematic diagram illustrating the present invention, but, in actual practice, the absorption modulator circuit 14 might be embodied in an arrangement similar to that shown in Fig. 2 of the drawings, where the motor 18 and the shaft 19 are illustrated, as are also the conductors 20 and 21. However, instead of a single tuned circuit with a variable capacitor, a plurality of fixed tuned circuits specifically designated as 14*a*, 14*b*, 14*c*, 14*d*, 14*e*, etc., are provided, which, in accordance with the present invention, are mounted on the periphery of a cylindrical drum 90. Each of these circuits 14*a*, 14*b*, 14*c*, 14*d*, 14*e*, etc. is substantially identical with the circuit 14 already described, except that each is tuned to a different one of a plurality of frequencies corresponding to assigned television channels likely to be tuned in by the receiver 11. The corresponding parts of each of the tuned circuits, including the diodes and choke coils, are designated by the same reference numerals in Fig. 2 as in Fig. 1. The capacitors 16 are indicated as being adjustable in order to permit adjustment for exact tuning of the circuit desired in dependence upon the channels received by the receiver 11 in any particular locality. A transmission line 13 of the twin lead type is shown in Fig. 2 immediately adjacent to the drum 90, and it will be apparent that as the drum 90 is rotated by the motor 18, each of the circuits 14 is successively moved into maximum coupling with the transmission line 13. These circuits 14 are spaced sufficiently far apart on the drum so that when one circuit is in the maximum coupling position with the transmission line 13, the adjacent circuits are negligibly coupled to the same line. This arrangement does away entirely with switching high radio frequencies, and is an important feature of the present invention. For the purpose of permitting rotation of the drum 90, each of the tuned circuits 14 is connected to slip rings 91 and 92, which are connected to the conductors 20 and 21 through brushes 93 and 94, respectively.

Figure 5:
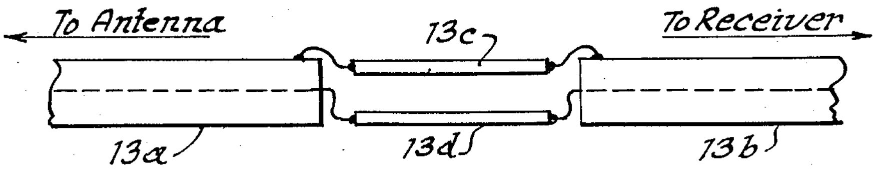
Fig. 5 illustrates one arrangement for coupling to the antenna circuit of the monitored receiver if coaxial cable is used as the transmission line between the receiver input terminals and the antenna.

In the event coaxial cable is used as the transmission line 13, the arrangement illustrated in Fig. 5 may be employed to obtain the desired degree of coupling between the line and the tuned circuits 14. As there shown, the cable is divided into two sections 13*a* and 13*b*, the first of which connects to the antenna 12, and the second of which connects to the input terminals of the receiver 11. Between these cable sections is connected a balanced line section having the same characteristic impedance as the coaxial cable, and consisting of two parallel extending rod sections 13*c* and 13*d* which are respectively connected to the sheath and center conductor of each of the cable sections 13*a* and 13*b*. These rods are located closely adjacent each other and extend longitudinally along the surface of the tuned circuit carrier cylinder 90. With this arrangement, the tuned circuit carrier 90 may be rotated to bring the tuned circuits 14 successively into close proximity to the exposed rods 13*c* and 13*d* so that the desired degree of coupling is successively obtained between the tuned circuits and the transmission line 13.

It will be appreciated that the degree of coupling of the absorption modulator circuit 14 should be sufficient to insure a measurable response. At the same time the coupling should not be so great as to interfere with the selectivity of the absorption modulator circuit 14. The degree of coupling will be affected by the standing wave ratio on the transmission line such as 13. Means are readily available, however, to improve the standing wave ratio where it is not satisfactory. It will be appreciated that where it is essential to use two different antennas and two different transmission lines, two drums such as 90 could be employed, mounted on a common shaft, and each associated with one of the two transmission lines involved. Alternatively, the arrangement illustrated in Fig. 4 may be employed for this purpose. As there shown, the tuned circuits 114*a*, 114*b*, 114*c*, 114*d* and 114*e*, which are respectively tuned to the different operating frequencies of different transmitters operating in the UHF band are spaced an equal distance *d* around one circumferential portion of the carrier cylinder 90, and the tuned circuits 114*f*, 114*g*, 114*h*, 114*i* and 114*j*, which are respectively tuned to the different operating frequencies of different transmitters operating in the VHF band, are spaced the same equal distance *d* around a second circumferential portion of the carrier cylinder 90. The twin lead transmission line 13 extending to the VHF antenna and the balanced line section 13*c*, 13*d* included in the coaxial cable extending to the UHF antenna both extend longitudinally of the carrier cylinder 90 in close proximity to the surface of the cylinder and are preferably spaced apart a distance *d* around the circumference of the cylinder, so that, as the cylinder is rotated by the shaft 19 in the direction indicated by the arrow, the tuned circuits 114*a*–114*e* are first successively moved into closely coupled relationship with the balanced line section 13*c*, 13*d*, and then the tuned circuits 114*f*–114*j* are successively moved into closely coupled relationship with the twin lead transmission line 13. A distance of the order of 2*d* is preferably maintained between the trailing VHF tuned circuit 114*j* and the leading UHF tuned circuit 114*a*, so that each tuned circuit coupling position of the carrier cylinder 90 is unique to one and only one transmitter to which the receiver 11 may be tuned for signal reception. In other words, this tuned circuit spacing arrangement precludes the possibility of one particular setting of the carrier cylinder 90 and, hence, of the recorder stylus 79 being representative of signal reception from a transmitter operating in the UHF band or signal reception from a transmitter operating in the VHF band.

Figure 4:
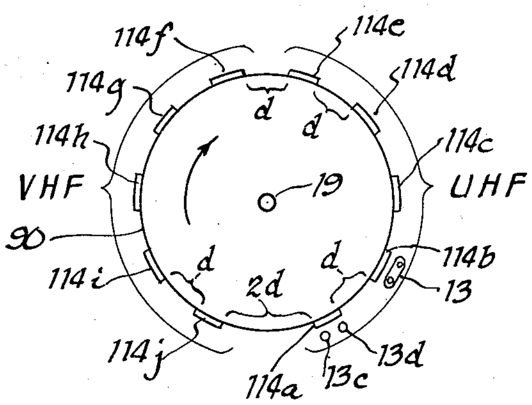
Fig. 4 illustrates a further modification of a portion of the apparatus shown in Fig. 1.

In view of the detailed description included above, the operation of the arrangement shown in Figs. 2, 4 and 5 of the drawings will readily be understood. It will, moreover, be appreciated that it completely eliminates the requirement of switching high frequency currents.

Figure 3:
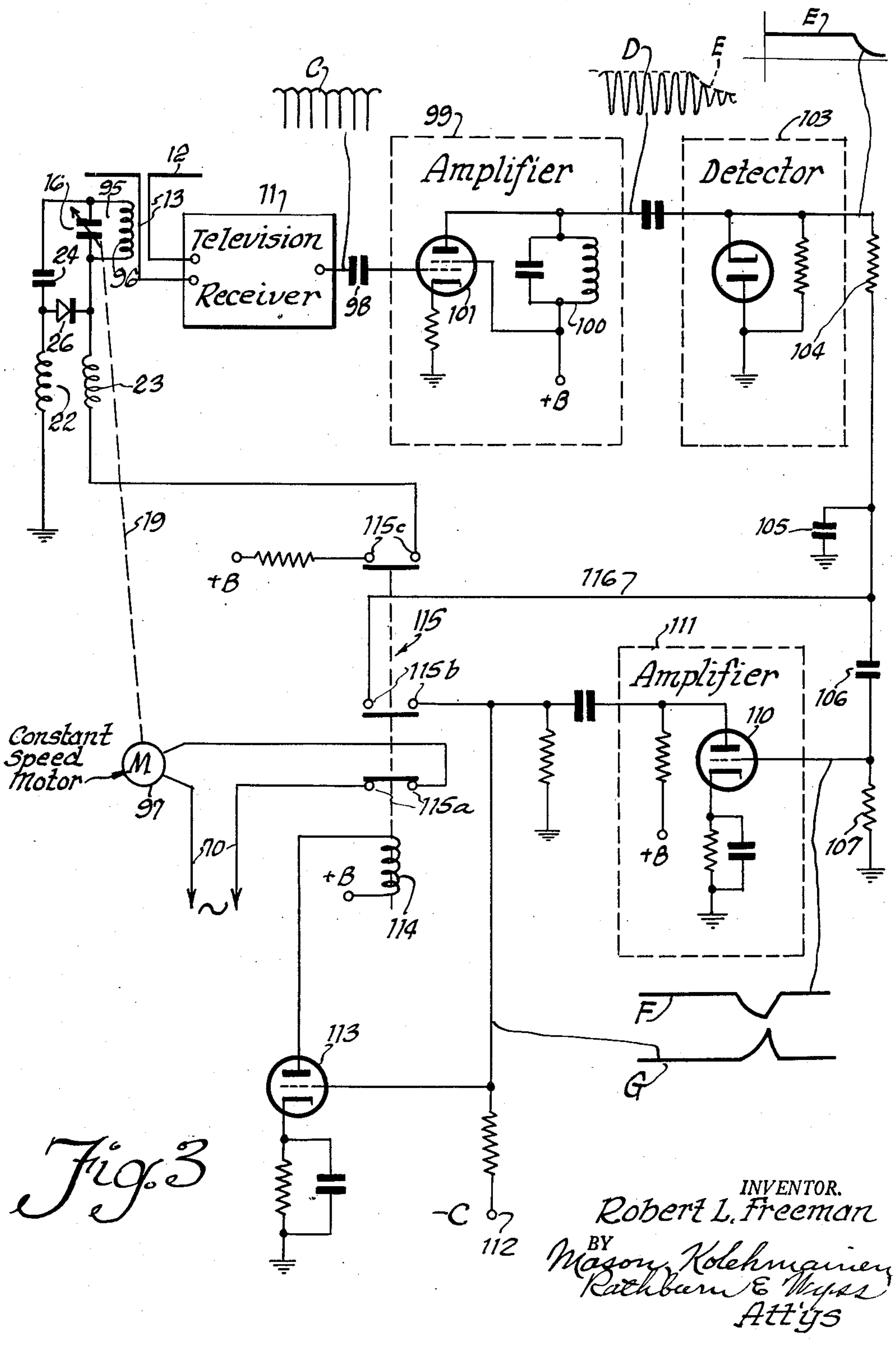
Fig. 3 is a schematic diagram somewhat similar to Fig. 1 illustrating still another embodiment of the present invention.

In the arrangement described thus far, some sort of modulating component was introduced by the absorption modulator circuit, which modulating component was subsequently sensed and used to produce a record of the tuning condition of the receiver. A damping diode 26 was employed to accomplish such modulation. It is possible to employ the teachings of the present invention without using a damping diode for producing modulation, but modulating the signal solely by reason of the change in tuning of the absorption modulator circuit with time. In Fig. 3 of the drawings there has been illustrated another embodiment of the present invention, which is, actually, a very simple version and in which an indication of the tuning condition of the wave signal receiver 11 connected to the antenna 12 by the transmission line 13 is obtained. As illustrated in Fig. 3, the absorption modulator circuit indicated by the reference numeral 95 merely comprises a tuned circuit including a fixed inductance 96 and a variable capacitor 16. The capacitor 16 has the variable element thereof actuated by means of a motor 97 connected thereto by a suitable shaft 19. The fixed inductance 96 is coupled to the transmission line 13 in the same manner as has been described in connection with Fig. 1 of the drawings. As the resonant frequency of the absorption modulator circuit 95 comes into coincidence with the frequency to which the television receiver 11 is tuned, there is a reduction in the signal amplitude supplied to the receiver, which reduction occurs for a short portion of the cycle of rotation of the motor 18 only when such frequency coincidence exists. For a rotation of shaft 19 of one revolution per minute, the frequency coincidence would exist for only a few seconds during each minute, and, obviously, a cyclic modulation would be applied by successive instances of frequency coincidence. In accordance with the present invention and as illustrated in Fig. 3, the leading edge of the signal amplitude change produced by the absorption modulator circuit 95 is used to indicate coincidence of frequency between the absorption modulator circuit 95 and the frequency of the signal tuned in by the receiver 11. Preferably and in order to indicate this signal change, there is obtained from the receiver 11 a signal including the horizontal synchronizing pulses always present in a television receiver when tuned for signal reception. Preferably, this signal is obtained at some point immediately following the second detector in the receiver 11, and this signal may have the form represented by the curve C shown in Fig. 3 of the drawings. This signal is applied through a coupling capacitor 98 to an amplifier 99, including a tuned circuit 100 resonant at a frequency of 15.75 kilocycles, which is the frequency of the horizontal synchronizing pulses. As illustrated, the amplifier 99 comprises a pentode 101. The output of the amplifier 99 is a sine wave signal having a frequency of 15.75 kilocycles. However, the envelope of the sine wave output which is indicated by the curve D in Fig. 3 of the drawings shows a disturbance in the form of a decrease in amplitude due to the coincidence of frequency of the absorption modulator circuit 95 with the frequency of the signal tuned in by the receiver 11. This drop in amplitude distinguishable from other disturbances which might occur is determined by the detector 103 which rectifies the sine wave signal output of the amplifier 99 and derives the envelope of the signal represented by the curve D, which envelope is designated by the curve E in Fig. 3 of the drawings. This envelope E is also shown in dotted lines associated with the curve D. It will be noted that in the curve D the drop in amplitude due to the coincidence of frequencies as mentioned above will cause the envelope E obtained at the detector 103 to have a decided dip. In order to remove the more rapid changes in envelope amplitude as well as the 15.75 kilocycle component, there is provided at the output of detector 103 a low pass filter comprising the resistor 104 and the capacitor 105. Additionally, there is also provided a high pass filter comprising the capacitor 106 and the resistor 107 to remove the slower amplitude changes. This filter is also connected to the output of the detector 103. The signal obtained after action by the high and low pass filters just described is applied to the control electrode of a triode 110 in an amplifier 111. The signal applied to this control electrode is designated by the curve F in Fig. 3, and shows a negative pulse occurring whenever the absorption modulator circuit 95 arrives at frequency coincidence with the signal frequency tuned in by the receiver 11. This pulse is amplified by the amplifier 111 and produces at the output thereof a positive pulse represented by the curve G of Fig. 3 of the drawings, which positive pulse is applied to the control electrode of a relay control tube 113 having its plate circuit connected to the winding 114 of a relay 115. A suitable negative bias from a source 112 normally renders the relay control tube 113 nonconductive and maintains the relay 115 deenergized as shown. In the deenergized condition, the relay 115 has two sets of contacts 115*b* and 115*c* open, and another set of contacts 115*a* closed. The relay contacts 115*a* are connected in the energizing circuit of the motor 97 which is connected to a source of alternating current 70. It will be apparent that the receipt of the positive pulse of the type shown by the curve G will cause relay 115 to be energized to open the motor control contacts 115*a* and deenergize the motor 97. For the purpose of maintaining the relay 115 energized once it has been energized due to the frequency coincidence condition described above until the receiver 11 is retuned, the relay holding contacts 115*b* of the relay 115 connect the control electrode of the relay control tube 113 to the output of the detector 104 through a conductor 116. Thus, the contacts 115*b* apply a positive holding signal corresponding to the curve E of Fig. 3 without the dip therein to the control electrode of the relay control tube 113. As long as horizontal synchronizing signals are present, this holding signal will maintain the relay 115 energized. However, as soon as a change in tuning of the receiver 11 occurs, the horizontal synchronizing pulses disappear momentarily, with the result that the positive holding bias on the control electrode of relay tube 113 disappears, whereupon relay 115 becomes deenergized. Such deenergization causes contacts 115*a* to close and the energization circuit for the motor 97 to recycle the absorption modulator circuit 95. In order to prevent the absorption modulator circuit 95 from reducing the input signal amplitude following energization of relay 115, the contacts 115*c*, which are effectively lockout contacts, are closed upon energization of relay 115 to connect a positive potential to the damping diode 118 making the absorption modulator circuit ineffective or in a "locked out condition."

Since the negative pulse represented by the curve E must exist for a period of at least three milliseconds and less than a hundred milliseconds, it is desirable that the motor 97 preferably run at a speed somewhat higher than that of the motor of Fig. 1 of the drawings. Preferably, a motor operating at sixty revolutions per minute would be satisfactory. With this arrangement it is possible to distinguish readily between the disturbance caused by the coincidence of frequency from the vertical synchronizing pulse or other disturbances that might occur, It will be appreciated that a suitable indicating or recording means similar to that shown in Fig. 1 of the drawings will be associated with the motor 97.

In view of the detailed description included above, the operation of the arrangement shown in Fig. 3 will readily be understood by those skilled in the art, particularly in conjunction with the curve diagrams indicating the nature of the signals appearing at various points in the circuit. It will, moreover, be appreciated that there has been provided a measuring circuit which without the provision of any separately generated modulation component but merely by means of the cyclic operation of an absorption modulator circuit indicates the tuning condition of a wave signal receiver.

While there have been illustrated and described several embodiments of the present invention, it will readily be appreciated by those skilled in the art that numerous changes and modifications can be made, and it is aimed in the appended claims to cover all those changes and modifications which fall within the true spirit and scope of the present invention.

What is claimed as new and desired to be secured by Letters Patent of the United States is:

1. In combination with a wave signal receiver which is tunable over a predetermined frequency range to receive signals radiated by different transmitters operating at different frequencies within said range, said receiver being provided with a tunable high frequency section into which a signal received from any one of said transmitters is introduced, signal control means operative at any selected tuned condition of said receiver for altering one of the characteristics of the signal received from one of said transmitters and introduced into the high frequency section of said receiver to produce a measurable response in said receiver, and means linked to said receiver and responsive to the production of said measurable response in said receiver for producing an indication of the transmitter to which said receiver is tuned for signal reception.

2. The combination set forth in claim 1 in which the means linked to the receiver includes means for rendering the signal control means ineffective to alter the one characteristic of the signal being received from the one transmitter.

3. The combination of claim 1 wherein said tunable high frequency section includes a section of high frequency transmission line into which a signal radiated by any one of said transmitters is introduced, and wherein said signal control means extracts signal energy from said transmission line thereby altering one of the characteristics of the signal radiated from one of said transmitters and received by said receiver.

4. In combination with a wave signal receiver which is tunable over a predetermined frequency range to receive signals radiated by different transmitters operating at different frequencies within said range, said receiver being provided with a tunable high frequency section into which a signal received from any one of said transmitters is introduced, signal control means operative at any selected tuned condition of said receiver for altering the amplitude of the signal received from one of said transmitters and introduced into the high frequency section of said receiver to produce a measurable response in said receiver, and means linked to said receiver and responsive to the production of said measurable response in said receiver for producing an indication of the transmitter to which said receiver is tuned for signal reception.

5. The combination set forth in claim 4 in which the signal control means momentarily depresses the amplitude of the signal received from one of the transmitters and introduced into the high frequency section.

6. In combination with a wave signal receiver which is tunable over a predetermined frequency range to receive signals radiated by different transmitters operating at different frequencies within said range, said receiver being provided with a tunable high frequency section into which signal energy received from any one of said transmitters is introduced, signal control means operative at any selected tuned condition of said receiver for momentarily altering the amplitude of the signal received from one of said transmitters and introduced into the high frequency section of said receiver, means for modulating the signal introduced into the high frequency section of said receiver with a control signal which is reproducible in said receiver during the period when the amplitude of the received signal is altered by said signal control means and means linked to said receiver and responsive to the reproduction of said control signal in said receiver for producing an indication of the transmitter to which said receiver is tuned for signal reception.

7. In combination with a wave signal receiver which is tunable over a predetermined frequency range to receive signals radiated by different transmitters operating at different frequencies within said range, said receiver being provided with a tunable high frequency section into which a signal received from any one of said transmitters is introduced, signal control means operative at any selected tuned condition of said receiver for altering one of the characteristics of the signal received from one of said transmitters and introduced into the high frequency section of said receiver to produce a measurable response in said receiver, means linked to said receiver and responsive to the production of said measurable response in said receiver for producing an indication of the transmitter to which said receiver is tuned for signal reception, means included in said last-named means for rendering said signal control means ineffective to alter said one characteristic of the signal being received from one transmitter, and means responsive to retuning of said receiver for again rendering said signal control means effective to alter said one characteristic of a signal received from another of said transmitters.

8. In combination with a wave signal receiver which is tunable over a predetermined frequency range to receive signals radiated by different transmitters operating at different frequencies within said range, said receiver being provided with a tunable high frequency section into which a signal received from any one of said transmitters is introduced and also being provided with a lower frequency section, cyclically operable signal control means wholly independent of any part of said receiver operative in response to tuning of said receiver and during an operating cycle thereof to alter one of the characteristics of the signal received from one of said transmitters and introduced into the high frequency section of said receiver to produce a measurable response in the lower frequency section of said receiver, control apparatus operative in response to the production of said measurable response in said lower frequency section of said receiver and including means linked to said lower frequency section of said receiver, means responsive to operation of said control apparatus for producing an indication of the transmitter to which said receiver is tuned, and means responsive to operation of said control apparatus for rendering said signal control means ineffective to alter said one characteristic of the signal being received from said one transmitter.

9. In combination with a wave signal receiver which is tunable over a predetermined frequency range to receive signals radiated by different transmitters operating at different frequencies within said range, said receiver being provided with a tunable high frequency section into which a signal received from any one of said transmitters is introduced and also being provided with a lower frequency section, cyclically operable signal control means wholly independent of any part of said receiver operative in response to tuning of said receiver to alter one of the characteristics of the signal received from one of said transmitters and introduced into the high frequency section of said receiver during an operating cycle thereof to produce a measurable response in the lower frequency section of said receiver, control apparatus operative in response to the production of said measurable response in said lower frequency section of said receiver and including means linked to said lower frequency section of said receiver, means responsive to operation of said control apparatus for producing an indication of the transmitter to which said receiver is tuned, means responsive to operation of said control apparatus for arresting the operation of said cyclically operable signal control means, and means responsive to retuning of said receiver for restarting operation of said signal control means.

10. In combination with a wave signal receiver which is tunable over a predetermined frequency range to receive signals radiated by different transmitters operating at different frequencies within said range, said receiver being provided with a tunable high frequency section into which a signal received from any one of said transmitters is introduced and also being provided with a lower frequency section, cyclically operable signal control means wholly independent of any part of said receiver operative in response to tuning of said receiver and during an operating cycle thereof to alter one of the characteristics of the signal received from one of said transmitters and introduced into the high frequency section of said receiver to produce a measurable response in the lower frequency section of said receiver, control apparatus operative in response to the production of said measurable response in said lower frequency section of said receiver and including means linked to said lower frequency section of said receiver, means responsive to operation of said control apparatus for producing an indication of the transmitter to which said receiver is tuned, and means responsive to operation of said control apparatus for arresting the operation of said signal control means and for rendering said signal control means ineffective to alter said one characteristic of the signal being received from said one transmitter.

11. The combination set forth in claim 10 which also includes means responsive to retuning of the receiver for restarting operation of the signal control means for again rendering the signal control means effective to alter a characteristic of a signal received from another of the transmitters.

12. In combination with a wave signal receiver which is tunable over a predetermined frequency range to receive signals radiated by different transmitters operating at different frequencies within said range, said receiver being provided with an antenna circuit and with a tunable high frequency section into which a signal received by said antenna circuit from any one of said transmitters is introduced, signal control means including a circuit coupled to said antenna circuit operative at any selected tuned condition of said receiver for altering one of the characteristics of the signal received from one of said transmitters and introduced into the high frequency section of said receiver to produce a measurable response in said receiver, and means linked to said receiver and responsive to the production of said measurable response in said receiver for producing an indication of the transmitter to which said receiver is tuned for signal reception.

13. In combination with a wave signal receiver which is tunable over a predetermined frequency range to receive signals radiated by different transmitters operating at different frequencies within said range, said receiver being provided with an antenna circuit and with a tunable high frequency section into which a signal received by said antenna circuit from any one of said transmitters is introduced, a tuned circuit coupled to said antenna circuit, means for controlling said tuned circuit to alter one of the characteristics of the signal introduced into the high frequency section of said receiver to produce a measurable response in said receiver, means linked to said receiver and responsive to the production of said measurable response in said receiver for producing an indication of the transmitter to which said receiver is tuned for signal reception, a uni-directional conductive device shunting said tuned circuit, and means responsive to the production of said measurable response in said receiver for rendering said device conductive, thereby to prevent said tuned circuit from altering said one characteristic of the received signal.

14. The combination set forth in claim 13 in which are provided means responsive to retuning of the receiver for rendering the device nonconductive.

15. In combination with a wave signal receiver which is tunable over a predetermined frequency range to receive signals radiated by different transmitters operating at different frequencies within said range, said receiver being provided with an antenna circuit and with a tunable high frequency section into which a signal received by said antenna circuit from any one of said transmitters is introduced, a tunable circuit coupled to said antenna circuit and tunable over said frequency range to extract signal energy from said antenna circuit at the particular frequency to which said tunable circuit is tuned, means for tuning said tunable circuit over said range to extract signal energy from said antenna circuit and thus reduce the amplitude of the signal introduced into the high frequency section of said receiver when said tunable circuit is tuned to the frequency of the transmitter to which said receiver is tuned for signal reception to produce a measurable response in said receiver, and means linked to said receiver and responsive to the production of said measurable response in said receiver for producing an indication of the transmitter to which said receiver is tuned for signal reception.

16. In combination with a wave signal receiver which is tunable over a predetermined frequency range to receive signals radiated by different transmitters operating at different frequencies within said range, said receiver being provided with an antenna circuit and with a tunable high frequency section into which a signal received by said antenna circuit from any one of said transmitters is introduced, a tunable circuit coupled to said antenna circuit and tunable over said frequency range to extract signal energy from said antenna circuit at the particular frequency to which said tunable circuit is tuned, means for tuning said tunable circuit over said range to extract signal energy from said antenna circuit and thus reduce the amplitude of the signal introduced into the high frequency section of said receiver when said tunable circuit is tuned to the frequency of the transmitter to which said receiver is tuned for signal reception to produce a measurable response in said receiver, means linked to said receiver and responsive to the production of said measurable response in said receiver for producing an indication of the transmitter to which said receiver is tuned for signal reception, a uni-direction conductive device shunting said tuned circuit, and means responsive to the production of said measurable response in said receiver for rendering said device conductive, thereby to render said tunable circuit ineffective to extract signal energy from said antenna circuit.

17. In combination with a wave signal receiver which is tunable over a predetermined frequency range to receive signals radiated by different transmitters operating at different frequencies within said range, said receiver being provided with an antenna circuit and with a tunable high frequency section into which a signal received by said antenna circuit from any one of said transmitters is introduced, a plurality of tuned circuits each tuned to the operating frequency of one of said transmitters and each operable, when coupled to said antenna circuit, to extract energy from said antenna circuit at the particular frequency to which it is tuned, carrier means for moving said tuned circuits successively into coupled relationship with said antenna circuit to extract signal energy from said antenna circuit and thus reduce the amplitude of the signal introduced into the high frequency section of said receiver when the particular tuned circuit which is tuned to the operating frequency of the transmitter to which said receiver is tuned for signal reception is moved into coupled relationship with said antenna circuit to produce a measurable response in said receiver, and means linked to said receiver and responsive to the production of said measurable response in said receiver for producing an indication of the transmitter to which said receiver is tuned for signal reception.

18. In combination with a wave signal receiver which is tunable over a predetermined frequency range to receive signals radiated by different transmitters operating at different frequencies within said range, said receiver being provided with an antenna circuit and with a tunable high frequency section into which a signal received by said antenna circuit from any one of said transmitters is introduced, a plurality of tuned circuits each tuned to the operating frequency of one of said transmitters and each operable, when coupled to said antenna circuit, to extract energy from said antenna circuit at the particular frequency to which it is tuned, carrier means for moving said tuned circuits successively into coupled relationship with said antenna circuit to extract signal energy from said antenna circuit and thus reduce the amplitude of the signal introduced into the high frequency section of said receiver when the particular tuned circuit which is tuned to the operating frequency of the transmitter to which said receiver is tuned for signal reception is moved into coupled relationship with said antenna circuit to produce a measurable response in said receiver, means linked to said receiver and responsive to the production of said measurable response in said receiver for producing an indication of the transmitter to which said receiver is tuned for signal reception, a uni-directional conductive device shunting each of said tuned circuits, and means responsive to the production of said measurable response in said receiver for rendering conductive the uni-directional conductive device shunting the tuned circuit which is coupled to said antenna circuit, thereby to render said tuned circuit ineffective to extract signal energy from said antenna circuit.

19. In combination with a wave signal receiver which is tunable over a predetermined frequency range to receive signals radiated by different transmitters operating at different frequencies within said range, said receiver being provided with an antenna circuit and with a tunable high frequency section into which a signal received by said antenna circuit from any one of said transmitters is introduced, a plurality of tuned circuits each tuned to the operating frequency of one of said transmitters and each operable, when coupled to said antenna circuit, to extract energy from said antenna circuit at the particular frequency to which it is tuned, carrier means for moving said tuned circuits successively into coupled relationship with said antenna circuit to extract signal energy from said antenna circuit and thus reduce the amplitude of the signal introduced into the high frequency section of said receiver when the particular tuned circuit which is tuned to the operating frequency of the transmitter to which said receiver is tuned for signal reception is moved into coupled relationship with said antenna circuit to produce a measurable response in said receiver, means linked to said receiver and responsive to the production of said measurable response in said receiver for producing an indication of the transmitter to which said receiver is tuned for signal reception, a uni-directional conductive device shunting each of said tuned circuits, means responsive to the production of said measurable response in said receiver for arresting movement of said carrier means and for rendering conductive the uni-directional conductive device shunting the tuned circuit which is coupled to said antenna circuit, thereby to render said tuned circuit ineffective to extract signal energy from said antenna circuit, and means responsive to retuning of said receiver for rendering non-conductive the uni-directional conductive device shunting the tuned circuit which is coupled to said antenna circuit and for reinitiating movement of said carrier means.

20. In combination with a wave signal receiver which is tunable over each of two different predetermined frequency bands to receive signals radiated by different transmitters operating at different frequencies within said two bands, said receiver being provided with an antenna circuit and with a tunable high frequency section into which a signal received by said antenna circuit from any one of said transmitters is introduced, a first group of tuned circuits each tuned to the operating frequency of one of the transmitters operating at a frequency in one of said bands, a second group of tuned circuits each tuned to the operating frequency of one of the transmitters operating at a frequency in the other of said bands, each of said tuned circuits, when coupled to said antenna circuit, being operable to extract energy from said antenna circuit at the particular frequency to which it is tuned, means for moving the tuned circuits of first one of said groups and then the other of said groups successively into coupled relationship with said antenna circuit to extract signal energy from said antenna circuit and thus reduce the amplitude of the signal introduced into the high frequency section of said receiver when the particular tuned circuit which is tuned to the operating frequency of the transmitter to which said receiver is tuned for signal reception is moved into coupled relationship with said antenna circuit to produce a measurable response in said receiver, and means linked to said receiver and responsive to the production of said measurable response in said receiver for producing an indication of the transmitter to which said receiver is tuned for signal reception.

21. In combination with a wave signal receiver which is tunable over each of two different predetermined frequency bands to receive signals radiated by different transmitters operating at different frequencies within said two bands, said receiver being provided with an antenna circuit and with a tunable high frequency section into which a signal received by said antenna circuit from any one of said transmitters is introduced, a first group of tuned circuits each tuned to the operating frequency of one of the transmitters operating at a frequency in one of said bands, a second group of tuned circuits each tuned to the operating frequency of one of the transmitters operating at a frequency in the other of said bands, each of said tuned circuits, when coupled to said antenna circuit being operable to extract energy from said antenna circuit at the particular frequency to which it is tuned, means for moving the tuned circuits of first one of said groups and then the other of said groups successively into coupled relationship with said antenna circuit to extract signal energy from said antenna circuit and thus reduce the amplitude of the signal introduced into the high frequency section of said receiver when the particular tuned circuit which is tuned to the operating frequency of the transmitter to which said receiver is tuned for signal reception is moved into coupled relationship with said antenna circuit to produce a measurable response in said receiver, means linked to said receiver and responsive to the production of said measurable response in said receiver for producing an indication of the transmitter to which said receiver is tuned for signal reception, a uni-directional conductive device shunting each of said tuned circuits, and means responsive to the production of said measurable response in said receiver for rendering conductive the uni-directional conductive device shunting the tuned circuit which is coupled to said antenna circuit, thereby to render said tuned circuit ineffective to extract signal energy from said antenna circuit.

22. The combination set forth in claim 21 in which means are provided which are responsive to retuning of the receiver for rendering the unidirectional conductive device nonconductive.

23. In combination with a television receiver which is tunable over a predetermined frequency range to receive signals, each including a synchronizing component, radiated by different television transmitters operating at different frequencies within said range, said receiver being provided with a tunable high frequency section into which signal energy received from any one of said transmitters is introduced, signal control means operative at any selected tuned condition of said receiver for altering the synchronizing component of the signal energy introduced into the high frequency section of said receiver from one of said transmitters to produce a measurable response in said receiver, and means linked to said receiver and responsive to the production of said measurable response in said receiver for producing an indication of the transmitter to which said receiver is tuned for signal reception.

24. In combination with a television receiver which is tunable over a predetermined frequency range to receive signals, each including a synchronizing component, radiated by different television transmitters operating at different frequencies within said range, said receiver being provided with a tunable high frequency section into which signal energy received from any one of said transmitters is introduced, signal control means operative at any selected tuned condition of said receiver for altering the amplitude of the synchronizing component of the signal energy introduced into the high frequency section of said receiver from one of said transmitters, and means linked to said receiver and responsive to the alteration of the synchronizing component of the signal energy introduced into the high frequency section of said receiver for producing an indication of the transmitter to which said receiver is tuned for signal reception.

25. In combination with a television receiver which is tunable over a predetermined frequency range to receive signals, each including a synchronizing component, radiated by different television transmitters operating at different frequencies within said range, said receiver being provided with a tunable high frequency section into which signal energy received from any one of said transmitters is introduced, cyclically operable signal control means wholly independent of any part of said receiver for altering the synchronizing component of the signal energy introduced into the high frequency section of said receiver from one of said transmitters during each operating cycle thereof to produce a measurable response in said receiver, means linked to said receiver and responsive to the production of said measurable response in said receiver for producing an indication of the transmitter to which said receiver is tuned for signal reception and for interrupting the cyclic operation of said cyclically operable means, and means responsive to the disappearance of the synchronizing component of a received signal which occurs upon retuning of said receiver for reinitiating cyclic operation of said signal control means.

26. In combination with a television receiver which is tunable over a predetermined frequency range to receive signals, each including a synchronizing component, radiated by different television transmitters operating at different frequencies within said range, said receiver being provided with a tunable high frequency section into which signal energy received from any one of said transmitters is introduced, signal modifying means operative at any selected tuned condition of said receiver for modifying the signal introduced into the high frequency section of said receiver from one of said transmitters to produce a measurable response in said receiver, means linked to said receiver and responsive to the production of said measurable response in said receiver for producing an indication of the transmitter to which said receiver is tuned for signal reception, and means responsive to reproduction of the synchronizing component of the received signal in said receiver for thereafter rendering said receiver insensitive to said signal modifying means.

27. The combination set forth in claim 26 in which means are provided responsive to returning of the receiver for again rendering the receiver sensitive to operation of the signal modifying means.

28. In combination with a wave signal receiver which is tunable over a predetermined frequency range to receive signals radiated by different transmitters operating at different frequencies within said range, said receiver being provided with a tunable high frequency section into which a signal received from any one of said transmitters is introduced, a plurality of separate tuned circuits wholly separate from any part of said receiver, means operative at any selected tuned condition of said receiver for sequentially rendering said tuned circuits effective to alter one of the characteristics of the signal received from one of said transmitters and introduced into said tunable section to produce a measurable response in said receiver, and means linked to said receiver and responsive to the production of said measurable response in said receiver for producing an indication of the transmitter to which said receiver is tuned for signal reception.

29. In combination with a wave signal receiver which is tunable over a predetermined frequency range to receive signals radiated by different transmitters operating at different frequencies within said range, said receiver being provided with a tunable high frequency section into which a signal received from any one of said transmitters is introduced, a plurality of separate tuned circuits wholly separate from any part of said receiver, each of said circuits being tuned to one of said different frequencies, intermittently operated means operative at any selected tuned condition of said receiver for rendering said tuned circuits serially effective to alter one of the characteristics of the incoming signal introduced into said high frequency section, the characteristic of said incoming signal being altered to provide a measurable response in said receiver when the frequency of the incoming signal bears a predetermined relationship to the tuned frequency of the one of the separate tuned circuits which has been rendered effective by said intermittently operated means, and means linked to said receiver responsive to said measurable response and operable in synchronism with said intermittently operated means for producing an indication of the transmitter to which said receiver is tuned.

References Cited in the file of this patent

UNITED STATES PATENTS

| | | |
|---|---|---|
| 2,444,151 | Bliss | June 29, 1948 |
| 2,472,957 | Nicholson | June 14, 1949 |
| 2,499,875 | Pifer | Mar. 7, 1950 |
| 2,618,743 | Scherbatskoy | Nov. 18, 1952 |
| 2,646,513 | Marco | July 21, 1953 |
| 2,660,663 | Rahmel | Nov. 24, 1953 |
| 2,660,665 | Scherbatskoy | Nov. 24, 1953 |
| 2,772,351 | Machlin | Nov. 27, 1956 |

UNITED STATES PATENT OFFICE

CERTIFICATE OF CORRECTION

Patent No. 2,892,885 June 30, 1959

Robert L. Freeman

It is hereby certified that error appears in the printed specification of the above numbered patent requiring correction and that the said Letters Patent should read as corrected below.

Column 4, line 62, for "tme" read -- time --; column 5, line 51, for "connecting" read -- connection --; column 16, line 33, after "from" insert -- said --; column 22, line 10, for "returning" read -- retuning --.

Signed and sealed this 15th day of December 1959.

(SEAL)
Attest:

KARL H. AXLINE
Attesting Officer

ROBERT C. WATSON
Commissioner of Patents